(12) United States Patent
Chu

(10) Patent No.: US 8,643,736 B2
(45) Date of Patent: Feb. 4, 2014

(54) METHOD AND APPARATUS FOR PARTICIPATING IN A VIRTUAL COMMUNITY FOR VIEWING A REMOTE EVENT OVER A WIRELESS NETWORK

(75) Inventor: Andrew Chu, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1288 days.

(21) Appl. No.: 11/771,480

(22) Filed: Jun. 29, 2007

(65) Prior Publication Data

US 2008/0163355 A1  Jul. 3, 2008

Related U.S. Application Data

(63) Continuation-in-part of application No. 11/616,443, filed on Dec. 27, 2006.

(51) Int. Cl.
- *H04N 5/232* (2006.01)
- *H04N 7/18* (2006.01)
- *H04N 7/173* (2011.01)
- *G06F 21/00* (2013.01)
- *H04W 4/00* (2009.01)

(52) U.S. Cl.
USPC ..... 348/211.11; 348/142; 705/52; 455/422.1; 725/109

(58) Field of Classification Search
USPC .............. 348/211.99–211.14; 455/556.1–560
See application file for complete search history.

(56) References Cited

U.S. PATENT DOCUMENTS

| 4,992,866 | A | 2/1991 | Morgan |
| 5,600,368 | A | 2/1997 | Matthews |
| 6,002,768 | A | 12/1999 | Albanese et al. |
| 6,137,485 | A | 10/2000 | Kawai et al. |
| 6,144,375 | A | 11/2000 | Jain et al. |
| 6,271,752 | B1 | 8/2001 | Vaios |
| 6,658,091 | B1 | 12/2003 | Naidoo et al. |
| 6,675,386 | B1 | 1/2004 | Hendricks et al. |
| 6,714,238 | B2 | 3/2004 | Urisaka et al. |
| 6,850,496 | B1 | 2/2005 | Knappe et al. |
| 6,856,346 | B1 | 2/2005 | Kobayashi et al. |
| 6,919,921 | B1 | 7/2005 | Morota et al. |
| 6,965,399 | B1 | 11/2005 | Oka et al. |
| 7,106,360 | B1 | 9/2006 | Frederick |

(Continued)

FOREIGN PATENT DOCUMENTS

| CN | 1756348 | 4/2006 |
| EP | 1331751 | 7/2003 |
| WO | WO-2005/029445 | 3/2005 |

OTHER PUBLICATIONS

EPO Supplemental Search Report Issued in App. No. 07866052.9 on Feb. 21, 2012, which is a foreign counterpart application of the above-identified application.

*Primary Examiner* — Timothy J Henn
*Assistant Examiner* — Pritham Prabhakher

(57) ABSTRACT

An approach is provided for remotely participating over a wireless network in an event. Certification information corresponding to a ticket purchased for an event is received at a proxy server. The ticket permits control, via a mobile device over a wireless network, of a remote camera to view an event from a plurality of viewing perspectives. The proxy server maintains a plurality of communication sessions with the mobile devices over the wireless network, wherein the communication sessions correspond to the event and provide participation in a virtual community to experience the event.

20 Claims, 11 Drawing Sheets

(56) References Cited

U.S. PATENT DOCUMENTS

| | | |
|---|---|---|
| 7,373,395 B2 | 5/2008 | Brailean et al. |
| 7,382,397 B2 * | 6/2008 | Mottur .......................... 348/142 |
| 8,010,631 B2 | 8/2011 | Brailean et al. |
| 8,089,520 B2 | 1/2012 | Ko et al. |
| 8,103,545 B2 * | 1/2012 | Ramer et al. ............... 705/14.49 |
| 8,364,521 B2 * | 1/2013 | Ramer et al. ............... 455/556.1 |
| 8,366,531 B2 * | 2/2013 | Walker et al. .................. 463/16 |
| 2003/0093430 A1 | 5/2003 | Mottur |
| 2003/0206232 A1 | 11/2003 | Suzuki et al. |
| 2004/0056964 A1 | 3/2004 | Kawai et al. |
| 2004/0148353 A1 | 7/2004 | Karaoguz et al. |
| 2004/0163118 A1 | 8/2004 | Mottur |
| 2005/0181765 A1 | 8/2005 | Mark |
| 2005/0289627 A1 * | 12/2005 | Lohman ....................... 725/109 |
| 2006/0010199 A1 | 1/2006 | Brailean et al. |
| 2006/0217113 A1 * | 9/2006 | Rao et al. ................... 455/422.1 |
| 2006/0294012 A1 * | 12/2006 | Brattesani et al. ............. 705/52 |
| 2007/0250900 A1 | 10/2007 | Marcuvitz |

* cited by examiner

METHOD AND APPARATUS FOR PARTICIPATING IN A VIRTUAL COMMUNITY FOR VIEWING A REMOTE EVENT OVER A WIRELESS NETWORK

RELATED APPLICATIONS

The present application is a Continuation-In-Part of U.S. patent application Ser. No. 11/616,443 filed Dec. 27, 2006, entitled "Method and System of Providing a Virtual Community for Participation in a Remote Event"; the contents of which are hereby incorporated by reference.

BACKGROUND INFORMATION

Public events, such as sports games, concerts, etc., are routinely televised. However, the viewers' experience is less than satisfying as attendance at these events involves an experience beyond simply a visual one. Other factors that contribute to the user experience at these events include interaction with other attendees and an ability to control one's view of the events. Also, attendance at a game is more than a visual experience, but is a social event in which people spend time with friends and family members. A television (TV) program cannot simulate, for example, a stadium atmosphere, whereby attendees can enjoy interacting with peers and hearing the roars of the crowd. Traditional television technology only allows a viewer to watch an event from a perspective chosen by the program editors. Hence, the viewer can only passively follow what is provided from the broadcast source and thereby is prevented from following a favorite player or entertainer that is not the focus of the television coverage. In addition, the television viewer receives commentary of the event as presented by only those individuals selected by, and in the employ of, the producers of the telecast. For sports as well as public events, these selected individuals may be out of favor with viewers. In short, traditional television viewing provides a limited experience.

Recent developments have targeted broadcast of video over wireless networks. Wireless technologies have afforded users the added flexibility of mobility and convenience. However, bandwidth constraints have limited such applications over wireless systems, even more so than traditional wired television deployments. Additionally, the processing power of mobile devices is constrained, largely by cost and power consumption; consequently, this limited processing capability is an obstacle for television viewing over such devices.

Unless an event is truly spectacular, potential participants may be disinclined to attend an event for various reasons. For example, traveling to a sports venue can be extremely burdensome, as traffic is often problematic, and thus requires leaving for the event well in advance of the start time. Also, if the venue is of a significant distance, travel time and transportation costs (e.g., gas, maintenance, etc.) can present a serious barrier to attendance.

Television remains the prevalent global medium for entertainment and information. With the convergence of telecommunications and media services, there is increased competition among service providers to offer more services and features to consumers and concomitantly develop new revenue sources. Traditional telecommunication companies are entering the arena of media services that have been within the exclusive domain of cable (or satellite) television service providers. Little focus has been paid to enhancing user control of the viewing experience.

Therefore, there is a need for providing features that enhance user experience during broadcast of an event, particularly in a wireless environment.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

An apparatus, method, and software for viewing an event as part of a virtual community over a wireless system are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
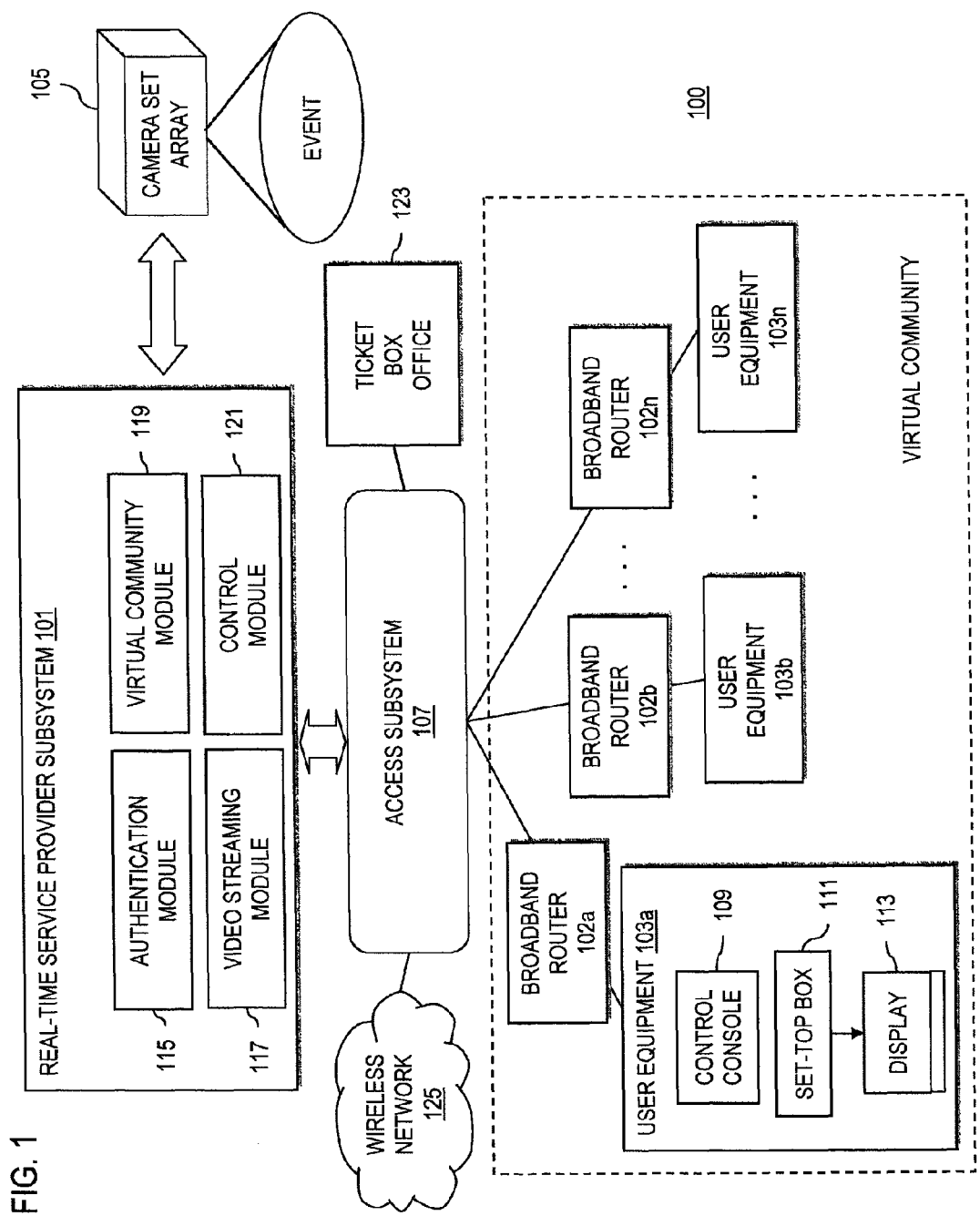
FIG. 1 is a diagram of a video system capable of providing a virtual community for viewing an event over a wireless network, according with an exemplary embodiment.

FIG. 1 is a diagram of a video system capable of providing a virtual community for viewing an event over a wireless network, in accordance with an exemplary embodiment. A video system 100 includes a real-time service provider subsystem 101 for permitting users via user equipment 103*a*-103*n* to attend an event using an array of camera sets 105. A user can watch a game or show through a dedicated, remotely controllable camera and microphone (which may be termed, in an exemplary embodiment, a "camera set"), while interacting with other virtual spectators through private communications channels. The system 100 thus provides a virtual community of users to experience a common event.

An access subsystem 107 can employ various broadband access technologies including digital subscriber line (DSL), FiOS (Fiber Optic Services), cable and WiMAX (Worldwide Interoperability for Microwave Access), to connect the user equipment 103a-103n to services of the real-time service provider subsystem 101. As shown, according to one embodiment, the user equipment 103a includes a control console 109, and a set-top box 111 that outputs to a display 113. The display 113 and set-top box 111 can support high resolution video streams, such as high definition TV (HDTV). The set top box 111 can encapsulate data into proper format with required credentials before transmitting onto the subsystem 107 through a local broadband router 102a, and de-encapsulate the incoming traffic to dispatch the data to the HDTV display 113, voice channel, or control console 109, depending on the destination of the data. In an exemplary embodiment, assuming the HDTV display 113 is Internet Protocol (IP) capable (i.e., the display includes an IP stack, or is otherwise network addressable), the function of the set top box 111 might be subsumed with the display 113. For example, an IP ready HDTV display 113 can be directly connected to the broadband router, whereas a local network switch port is provided on the HDTV to route the IP traffic between the broadband router and the control console 109. The control console can be either a separate PC (Personal Computer) or integrated into the HDTV with a keyboard and mouse. Although the control console 109, the set-top box 111, and the display 113 are shown as separate components, it is contemplated that these components can be integrated in various combinations.

In one embodiment, the real-time service provider subsystem 101 utilizes an authentication module 115 to perform authentication services of the participant. A video streaming module 117 is used to acquire video feeds from the camera set array 105 and to transmit the feeds over the access subsystem 107 to the particular user equipment. The system 100 supports end-to-end data encryption with the video streaming services (when enabled) so that only legitimate users are able to view the content.

A virtual community module 119 is included in the subsystem 101 to provide user functions for community building, such as communication establishment among the participants and sharing and/or exchanging of views. The real-time service provider subsystem 101 also has a control module 121 to act as a proxy for a user to remotely control a camera set 105.

The control console 109, in an exemplary embodiment, includes an input device, such as a keyboard and/or a mouse, to establish credentials with the authentication module 115, to communicate with the virtual community module 119 to start or join a virtual community, and to establish connectivity with other users. The control console 109 can also include a joy stick (or the mouse or keyboard), to control the remote camera set 105.

A ticket box office 123 permits users to purchase tickets for an event, thereby reserving a virtual seat at the arena. This entails assignment of a camera set 105 within the array deployed at the arena. Such capability provides greater flexibility in viewing choices, in that certain events are not broadcasted. For example, local sports games are routinely "blacked out." Also, during an Olympic game, for instance, unpopular events may receive little or no coverage.

As shown, a wireless network 125 communicates with the access subsystem 107 for transparently participating in the virtual community and transmitting multimedia and control signals. With wireless technology, it is recognized that the distribution of media (e.g., video) and management of communication sessions pose different engineering challenges than wired systems. These challenges stem, in large part, from the bandwidth limited nature of wireless systems, and the lower processing capability of mobile devices. Additionally, these mobile devices have display constraints, in terms of size and resolution. The wireless network 125 can utilize various wireless technologies including Third Generation Partnership Project (3GPP) systems, spread spectrum systems (such as Code Division Multiple Access (CDMA) networks), Time Division Multiple Access (TDMA) networks, WiMAX (Worldwide Interoperability for Microwave Access), etc. Some mobile technologies are not designed to support simultaneous multi-sessions (albeit developing technologies are beginning to address the need for greater bandwidth). For example, with the so called 3G technologies, a mobile user's bandwidth peak at about 2 Mbps with a normal rate of about 300 kbps. In a landline scenario, shared media is first constructed via a local console and then routed from the user device out of the local network to the remote users in the virtual community. Thus, the sharing demands a large bandwidth not only for downstream, but also upstream. The bandwidth associated with a mobile device is typically too low to sustain multiple multimedia channels for participation in the virtual community. The computational power of a mobile device currently is not generally powerful enough to maintain simultaneous multiple channels. In recognition of the above constraints, an approach, according to various embodiments, utilizes a mobile proxy for managing multiple channels and format conversion; this approach is more fully described in FIGS. 5-7.

Figure 2:
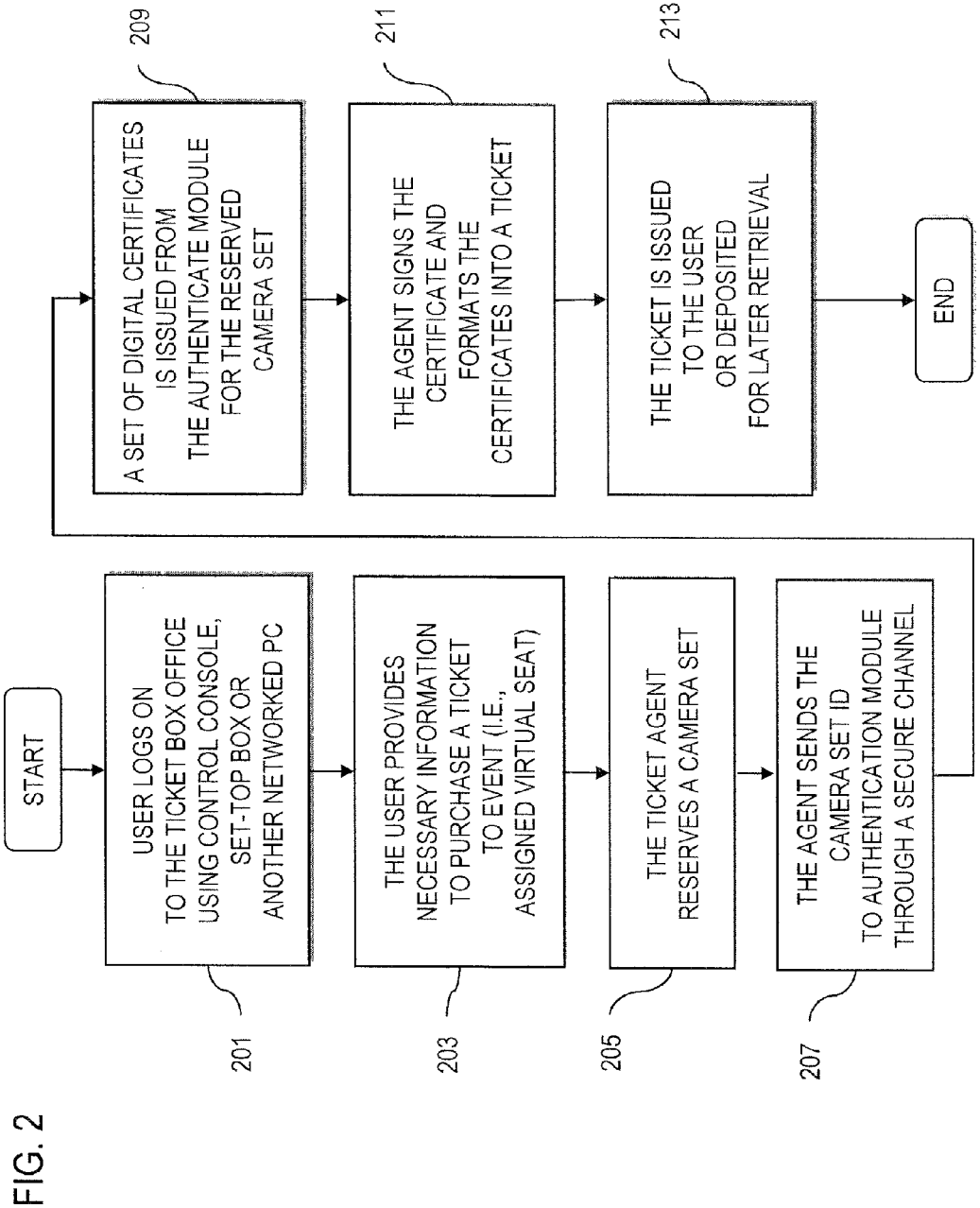
FIG. 2 is a flowchart of a process for purchasing a virtual seat to an event, according to an exemplary embodiment.
Figure 8:
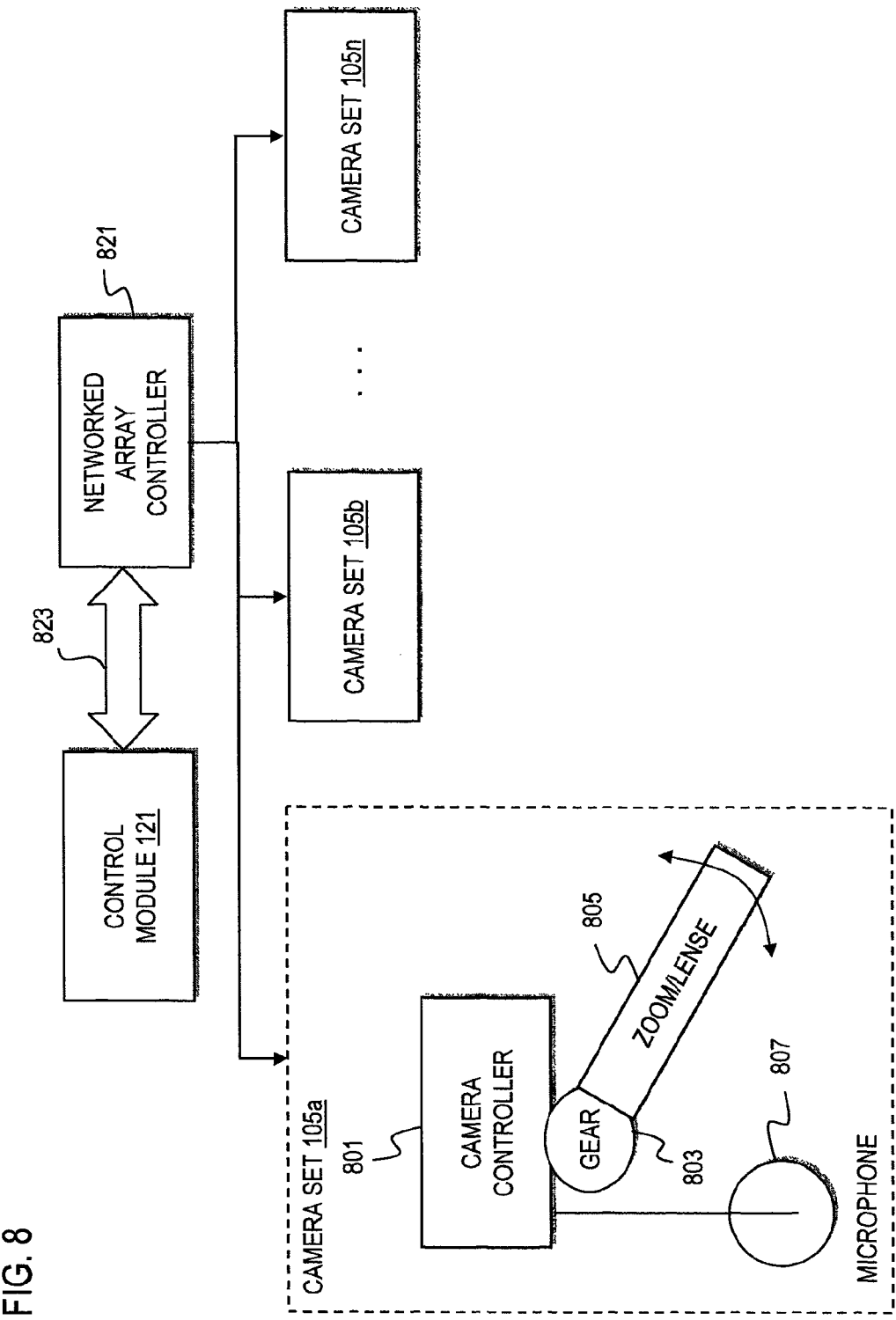
FIG. 8 is a diagram of an exemplary camera array used in the system of FIG. 1, according to an exemplary embodiment.

FIG. 2 is a flowchart of a process for purchasing a virtual seat to an event, according to an exemplary embodiment. In this example, a user logs on using, for example, the control console 109 (per step 201) to access the ticket box office 123. Alternatively, the user can select an appropriate menu supplied by the set-top box 111, which may be web-enabled. The console 109 accesses the ticket box office 123 to purchase a ticket, thereby obtaining a virtual seat to the event (step 203). The purchase can be conducted by a credit card transaction. The information required for a successful purchase transaction includes the information of user's credit card and the credentials of the user equipment 103. The information can be provided during the purchase or through a pre-registered user account with the ticket box office 123. The user equipment's credential typically includes the IP address or the IP address of an associated proxy server (not shown), and a digital certificate. The user wants to purchase a ticket for one virtual seat for a coming Friday's game in France, for instance. The ticket box office 123 maps the purchase to a camera set 105a as shown in FIG. 8, effectively reserving the camera set 105a for the purchaser (step 205). The ticket agent then sends the reserved camera set ID to authentication module 115 through a secure channel (step 207). Upon validating the agent's request, the authentication module 115 issues a set of digital certifications for the corresponding camera set 105, and sends the certificates back to the agent (step 209). The agent digitally signs the certificates and delivers them to the user in a form of ticket (step 211). The ticket can be delivered to the user at the end of the purchase, or can be deposited into a secured website for user to retrieve later at the game time (step 213). For example, the ticket may ensure one night rental of a specific camera 105 for the coming Friday game. The event may be one among multiple events, as next explained with respect to FIG. 3.

Figure 3:
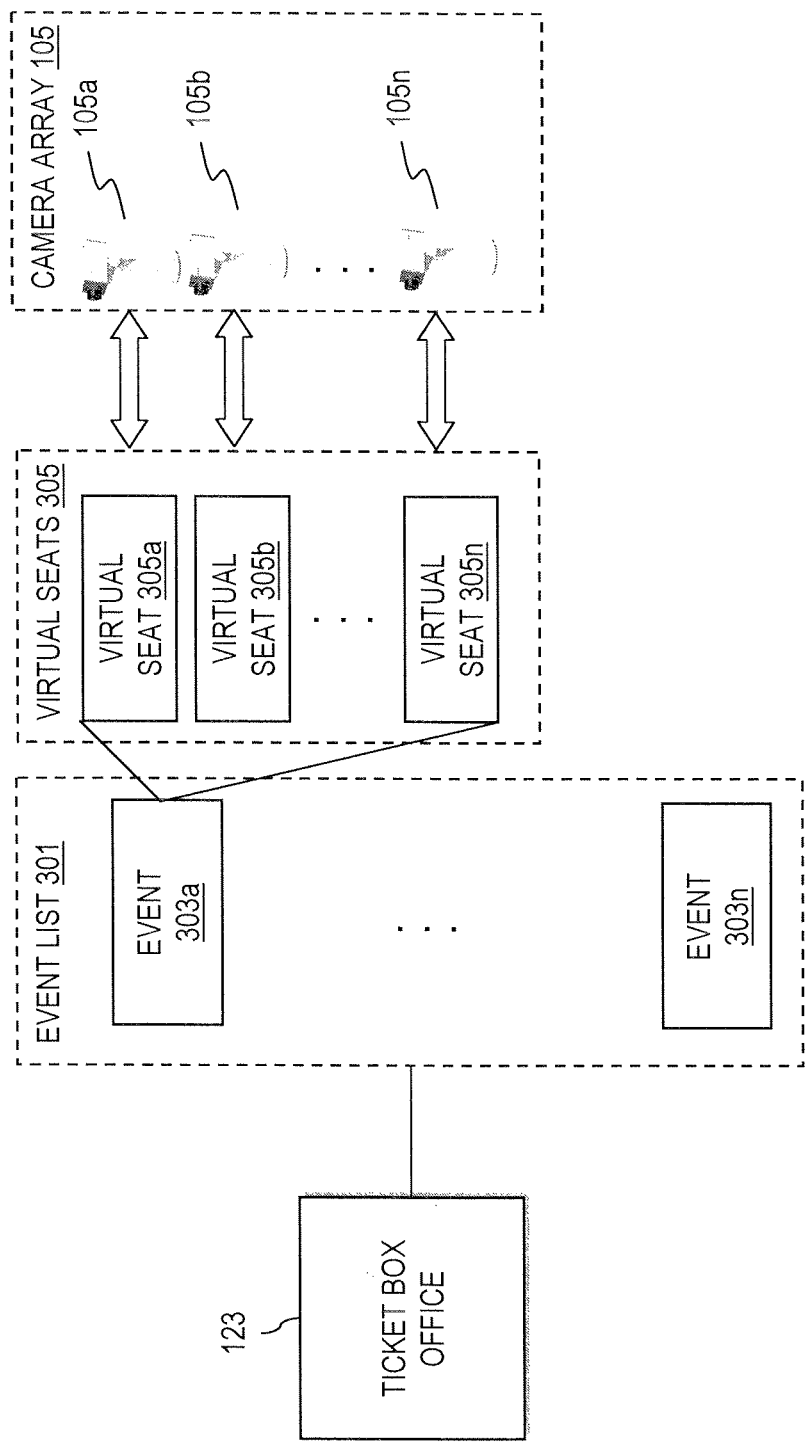
FIG. 3 is a diagram of an online ticket box office for purchasing a virtual seat to an event, according to an exemplary embodiment.

FIG. 3 is a diagram of an online ticket box office for purchasing a virtual seat to an event, according to an exemplary embodiment. The online ticket box office 123 can present to a user an event list 301. The list 301 can be displayed using a browser or any other graphical user interface (GUI) resident on the control console 109. As seen, multiple events 303a-303n are enumerated and can be categorized by various parameters, such as date, venue, artists, sports team, etc. Additionally, each of the events (e.g., event 303a) includes virtual seats 305a-305n. These virtual seats 305a-305n map to camera sets 105a-105n.

With the ticket box office 123, a user (or customer) can book a virtual seat with which the user can remotely participate in a sports event (e.g., basketball game). In addition, the events can include public affairs or news worthy events, such as a presidential inauguration ceremony, Olympic Games, a New Year celebration in Time Square, music performances in Vienna, etc.

Figure 4:
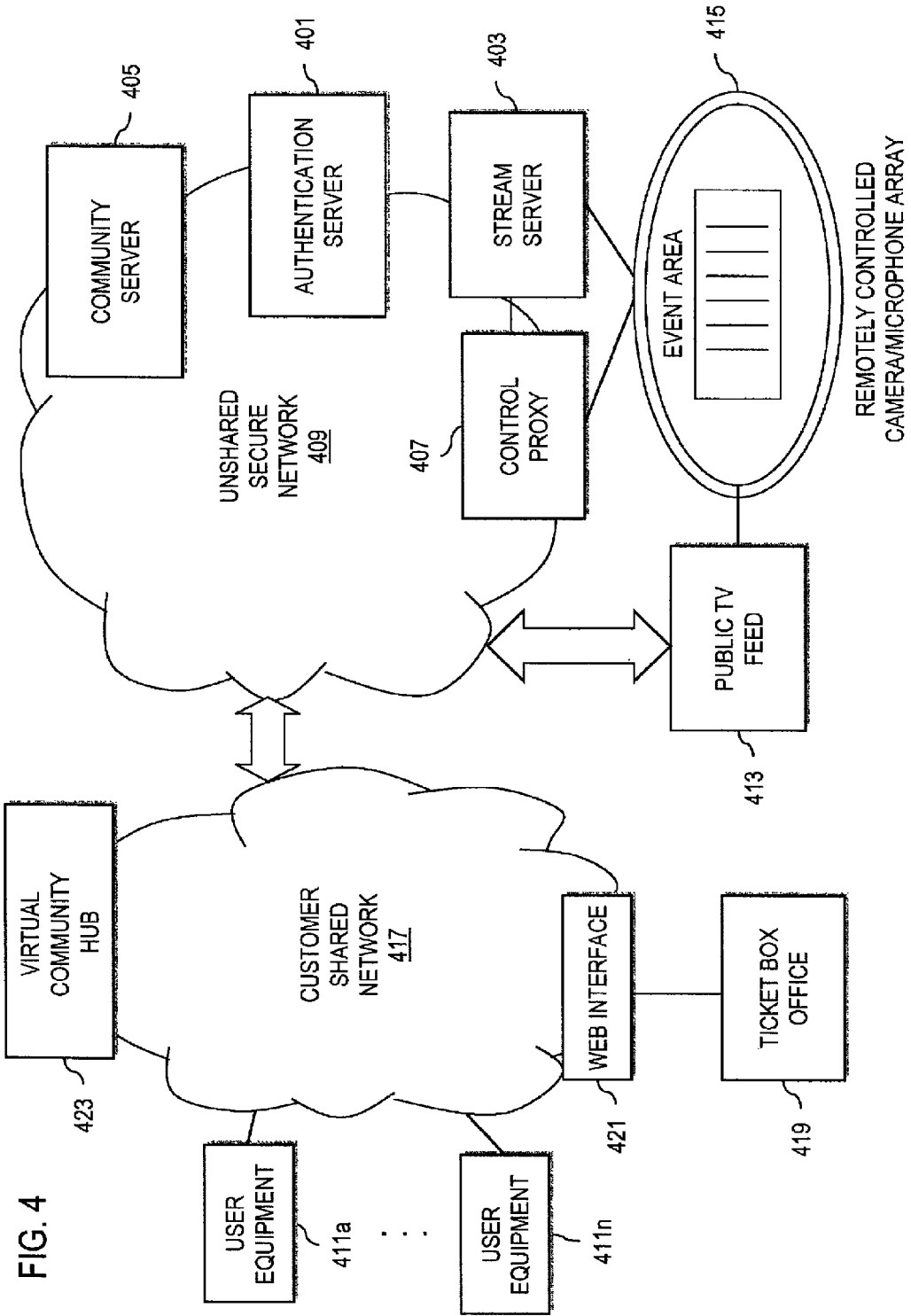
FIG. 4 is a diagram of an exemplary architecture of the system of FIG. 1, according to an exemplary embodiment.

FIG. 4 is a diagram of an exemplary architecture of the system of FIG. 1, according to an exemplary embodiment. Under this scenario, an authentication server 401, stream server 403 and a community server 405, along with a control proxy 407, are components of a real-time service provider subsystem. The components communicate using an unshared secure network 409. The authentication server 401 is a security device (or entity) that authenticates a user, authorizes services to the user, and maintains the authentication until the end of the prescribed period of time. The authentication server 401 can be, for example, a Kerberos based key issuing server, or can be a proprietary protocol based system; however, it is contemplated that other network authentication protocols can be utilized. Once a user is authenticated, connections from user equipment 411 to other servers are established directly, without involvement directly from the authentication server 401. The authentication server 401 can also grant a user the right to switch from one camera set 105a to another by revoking the existing digital certificates associated with the ticket, and issuing a new set of digital certificates that is mapped to another camera set 105b. The user's set-top box 111 can then start a new session from the new camera set 105b, whereas the previous session is automatically closed because of the revocation of the "old" or prior certificates associated with the old ticket.

Video and audio data flow generated from the camera set 105 is first forwarded to the video stream server 403 for further processing. The video stream server 403 performs the video stream coding/decoding (codec), compression and encryption (if required) before the data stream is passed onto the network 409. The server 403 also provides video frame mixing if more than two video channels are subscribed at the same time by a user, wherein one channel is a private channel while the other could be a public TV feed (or channel) 413. The video and audio data are thereafter delivered from the stream server 403 to the user equipment 411.

Another service that is provided by the stream server 403 involves adding a "virtual grid" over the camera view if demanded by the customer. A virtual grid is the visualization of a coordination system that is mapped to the geographical area of the event. The values of the coordinates are dependent only on the geographical location, and are independent of the viewing perspective from the users. For example, one embodiment of a virtual grid is the Global Positioning System (GPS) coordinates projected as a light colored mesh over the viewing field. Each physical spot can be uniquely identified within a section of the virtual grid, regardless of different viewing angles from different camera sets. With the virtual grid, the customer can identify the location of an event in the view with their virtual community. The use of the virtual grid can thus provide different users a common reference when the subject of interest is viewed from individual angles.

The community server 405 maintains, for example, a username, customer CPE (customer premises equipment) IP addresses, and the credentials issued by the authentication server 401. After the user equipment 411 initiates establishment of a connection with the community server 405, a virtual community list is sent to the user who can pick from the list to join the community. A new community can be established when a user creates a new entry into the community list.

The control signal proxy 407 serves as a protocol gateway, which takes the customer's control signal to the camera, potentially converting the signals to the protocol that the camera is compatible with, and passes the converted signals to the camera 415. Also, the control signal proxy 407 takes a camera's feed back and passes the feed onto the customer's control console, which provides a "dashboard" to display the status of the camera set (e.g., 105a . . . 105n), such as the angles of the camera's lens, the aperture of the zoom and microphone volume.

In this example, a customer shared network 417 serves as an access network, which can be a wired (e.g., FiOS, DSL, cable, etc.) or a wireless system. The customer shared network 417, in an exemplary embodiment, supports broadband services with QoS (Quality of Service) mechanisms to ensure adequate video and audio quality. The access network 417 can supply high speed down stream links, e.g., 6 Mbps or more. The bandwidth requirement for the access network 417 is not only determined by the video stream from the stream server 403, but also the traffic stemming from the capability to control the cameras 415 as well as communication exchange within the virtual community. Such virtual community traffic, for example, includes multi-channel phone conversations and video/graphic exchange among the virtual neighbors. While viewing the event, the user can choose to listen to a commentator, or open a small window on the display to watch the public TV feed 413. Under this arrangement, the user can follow the subject of interests instead of passively following a broadcast TV program. The system allows a user to participate in a game that is occurring thousands of miles away, and share the game with a virtual community that can spread over the entire globe.

The access network 417 can provide secure communication for the virtual community members. A dynamic routing protocol can assist with quickly building and updating a full mesh network for the virtual community. In one embodiment, the access network 417 also provides connection between customers and an online ticket box office 419, which can support a web interface 421 (e.g., web server) for purchase of virtual seats by the users. There are multiple types of infrastructures through which virtual community members can communicate. For example, a virtual community can communicate through a virtual community hub 423 that receives and executes computer instructions from the community server 405. This is a more scalable infrastructure for a large virtual community, with shortcomings such as the requirement for additional central processing equipment (the virtual community hub 423) and added latency due to process delays within the virtual community hub 423. Another way a virtual community can communicate is through a dynamically full-mesh private virtual network (VPN) in the customer shared network 417. This infrastructure requires no additional equipment that would add latency, but may be limited to smaller establishment of virtual communities, and may require that the VPN be capable of dynamical full meshing either through Layer 2 switching or Layer 3 routing. These layers refer to the Open System Interconnection (OSI) model, according to one embodiment. In yet another infrastructure through which virtual community members can communicate can involve the combination of the above two architectures for a mixture of large and small virtual communities.

Figure 5:
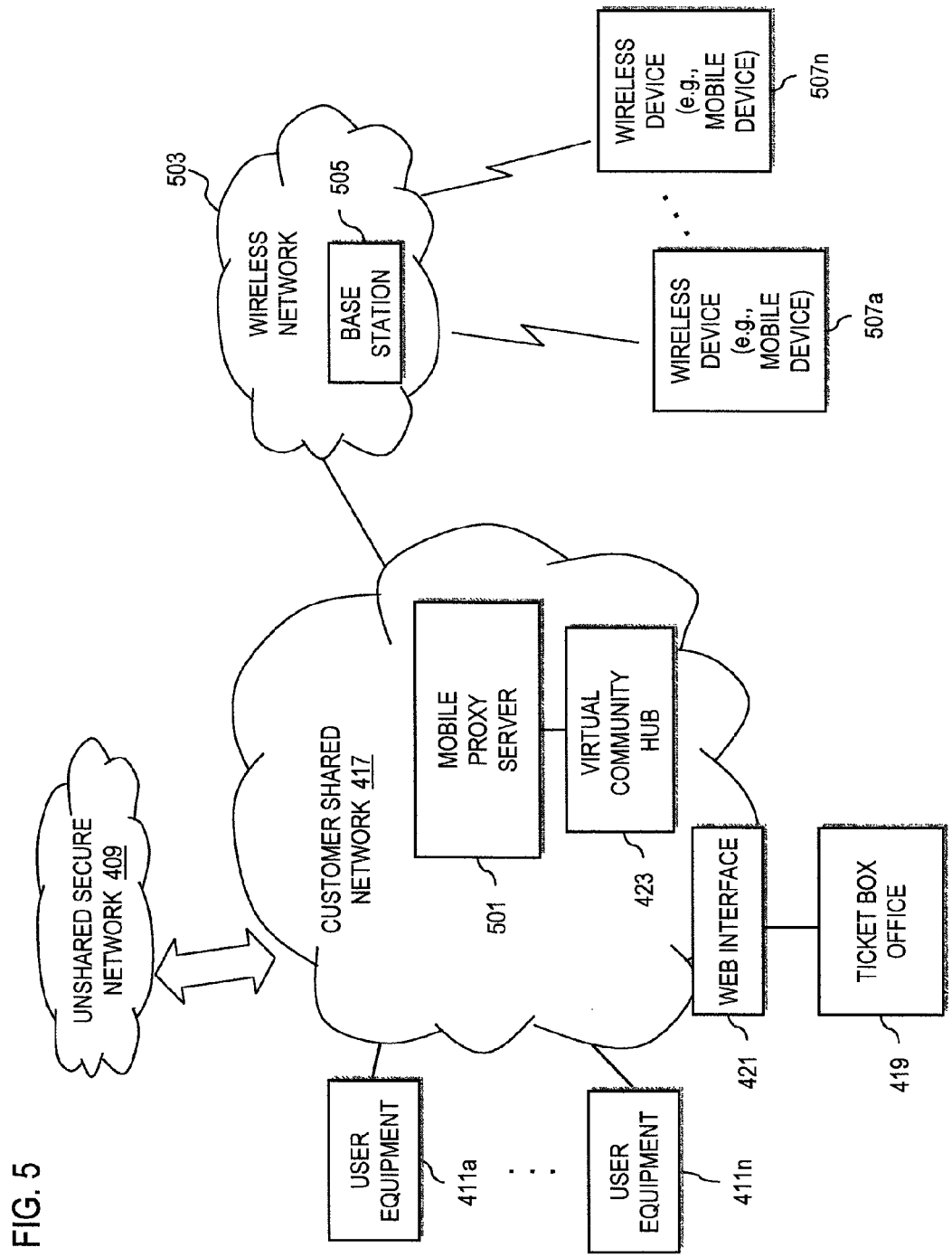
FIG. 5 is a diagram of a communication system for providing participation in an event using a wireless network, according to an exemplary embodiment.

FIG. 5 is a diagram of a communication system for providing participation in an event using a wireless network, according to an exemplary embodiment. Under this scenario, the customer shared network 417 utilizes a mobile proxy (e.g., as implemented in a server) 501 to interface with the virtual community hub 423 and a wireless network 503. The proxy 501, as an intermediary, can provide server and/or client functions. The wireless network 503, as mentioned, can be any type of radio network, and includes base stations (one of which is shown) 505 to communicate with wireless devices 507a-507n. These wireless devices 507a-507n can be fixed terminals or mobile terminals. For the purposes of illustration, the devices 507a-507n are mobile; exemplary mobile devices 507a-507n include cellular handsets, personal digital assistants (PDAs), laptops, or any portable computing device with a radio interface that is compatible with the wireless network 503.

As evident from the discussion of the virtual community, one function is to share video and graphic images, nearly instantaneously (akin to Instant Messaging (IM) communications). Due to the smaller size of the display of a mobile device, a graphic cannot be directly shared between a mobile device and an HDTV set, or among mobile devices 507a-507n of different display capabilities (e.g., size and resolution). Consequently, the mobile proxy server 501 has the capability to alter display formats for the mobile devices 507a-507n.

According to one embodiment, the mobile proxy server 501 is installed on the edge of the shared customer network 417 and the mobile network 503. In this example, the incoming traffic from the landline network to the mobile device (e.g., device 507a) is first terminated at the mobile proxy server 501. The traffic is first formatted to fit the mobile device 507a before the traffic is delivered to the mobile user as a single session via the mobile network 503 through the base station 505.

The outgoing traffic originates from the mobile proxy server 501. Each mobile device 507a-507n in effect acts as the remote control console for the proxy process responsible for the outgoing traffic. This arrangement addresses the constrained bandwidth issue and provides a way to support multiple simultaneous sessions that might not be natively supported by the mobile device 507a, as we will be discussing next.

Figure 6:
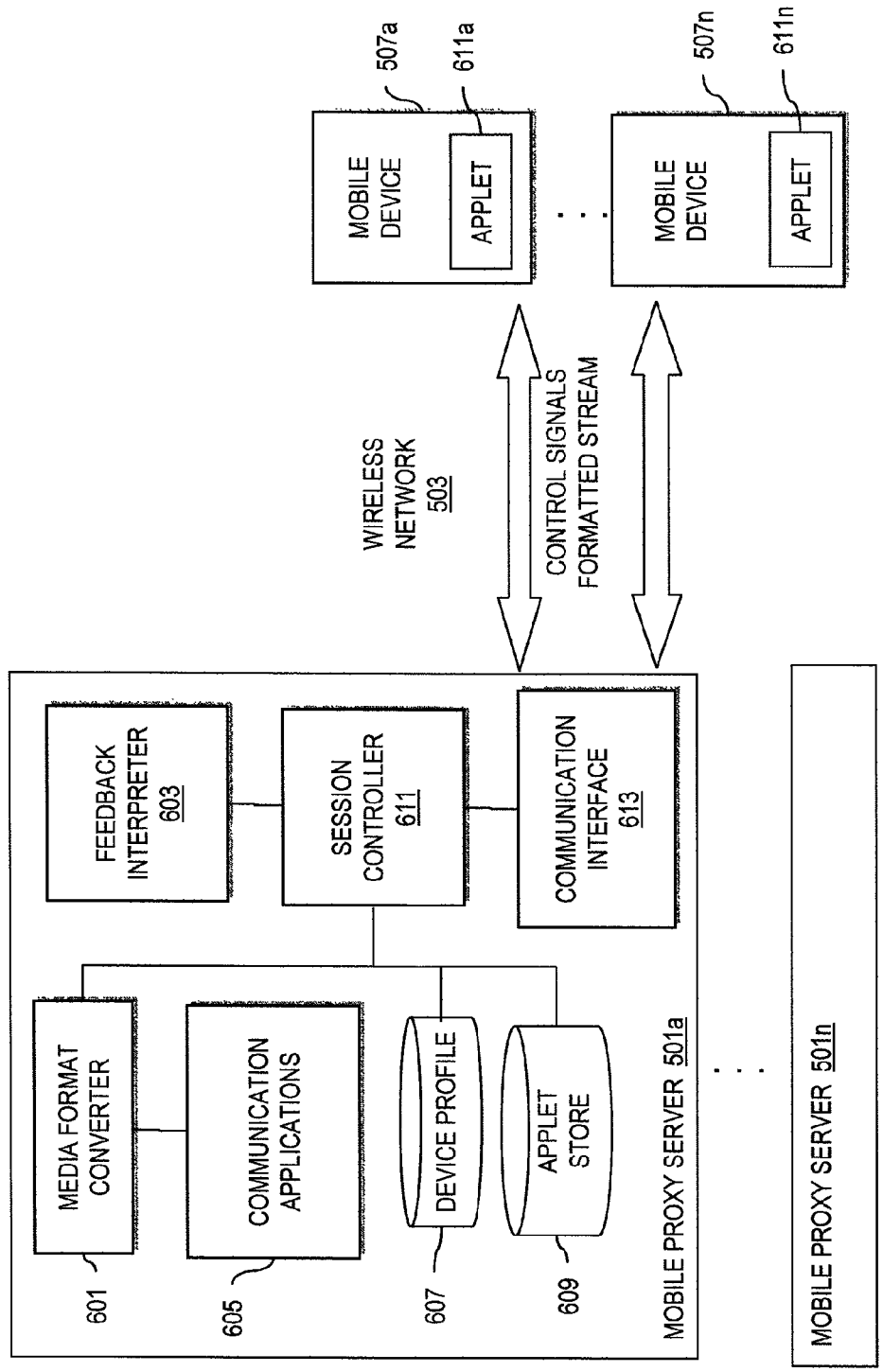
FIG. 6 is a diagram of a mobile proxy server, according to an exemplary embodiment.

FIG. 6 is a diagram of a mobile proxy server, according to an exemplary embodiment. Components of the mobile proxy server 501 include a media format converter (MFC) 601, a feedback interpreter 603, communication application suite 605, a device profile database 607, an applet store 609, a session controller 611, and a communication interface 613.

The device profile database 607 stores display information or parameters for each of the mobile devices 507a. For example, the display information can specify display size, resolution, and maximum contrast, etc. corresponding to the manufacturer, model, and user preference.

The media format converter (MFC) 601 is a key component in the mobile proxy server 501. Data stream received from the communication application suite 605, such as audio and video streams, are first fed into MFC 601. The MFC 601 converts all video streams and text messages into a single video stream for proper display format according to the profile and preference of the corresponding user mobile device, and merges all audio streams into one channel. The data are then transmitted to the user wireless device using proper data structure understood by the applet (e.g., applet 611a), thus reducing multiple sessions on the wired network side to a single session on the mobile device 507a. A session of one mobile device 507a can be maintained by one MFC process, and plurality of wireless devices 507a-507n can be supported by one mobile proxy server 501a through process multiplexing such as the session controller 611. These communication sessions are transported over a communication interface 609 to be further transmitted to the wireless network 503.

The operation of the feedback interpreter 603 is as follows. Any data that is sent back to the mobile proxy server 501a from the user mobile device 507a on the application layer is first examined by the feedback interpreter 603 to determine which session the data is intended on the network side. For instance, if the data is a camera control signal, it is sent to the camera controller through the, for example, a TCP session between the camera controller and the mobile proxy server 501a.

From the proxy server 501, a mini-program (e.g., a client side applet) can be downloaded from the applet store 609 by the mobile devices 507a-507n. The applet store 609 is capable to dynamically construct an applet according to a device profile for the wireless device 507a to download. An instance of applet 611a downloaded on the mobile device 507a provides the function of establishing a single session that simulates multiple simultaneous sessions. The preformatted stream from the mobile proxy server 507a is processed by the applet and displayed. In an exemplary embodiment, the applet 611a is downloaded from the applet store 609 and displays the pre-formatted media data received from the mobile proxy server. The pre-formatted media will be displayed as if multiple windows are opened—one to display the main event, and others to maintain connections to other users in the virtual community.

Another function of the applet 611a is to send control signals back to the mobile proxy server 501a. For example, when a user wants to share a fragment of video stream with members of virtual community, a set of control signals, instead of the actual video stream, is sent via the applet to the mobile proxy server, thus avoid redundant round trip. Similarly, when the user wants to alter the direction of the remote camera, camera control signals are sent via the applet to the mobile proxy server 501, interpreted by the feedback interpreter process 613, and then transmits to a controller (e.g., control module 121 of FIG. 1).

This capability not only saves bandwidth by pre-formatting media streams and reducing round trip traffic, but also allows graphics to be shared on devices with different display sizes and resolutions, as the proxy process can access other users' profiles (as stored in the device profile database 607), which include the parameters of their display devices, such as cell phone model or TV display resolutions. For security reasons, a proxy process may be restricted to access the profiles of other users in the same virtual community. Access to the profile database 607 can be controlled by the certificate that has been deposited on the proxy server from the wireless user.

The operations of the mobile proxy server 501 are now described.

Figure 7:
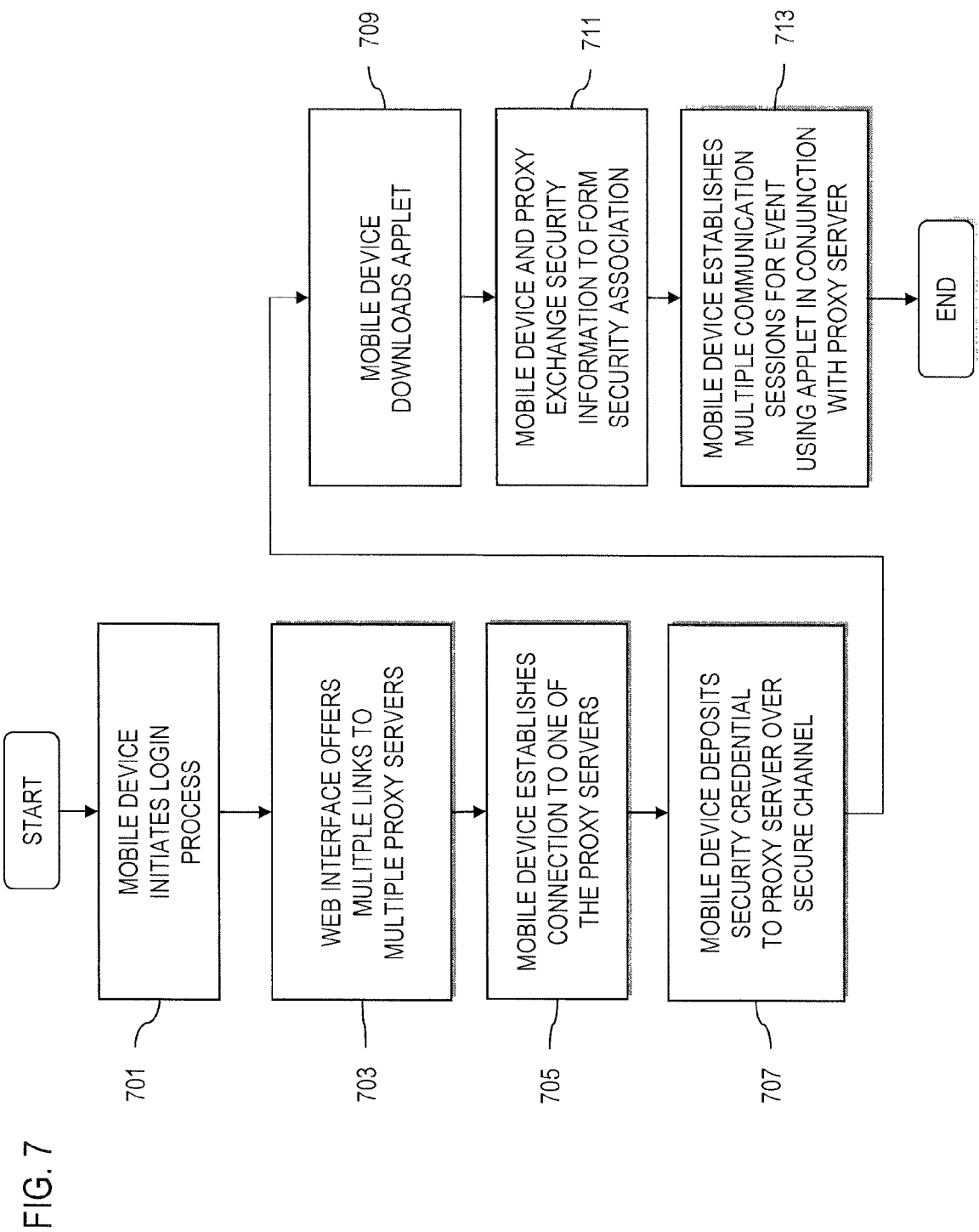
FIG. 7 is a flowchart of a process for participating in a virtual community, over a wireless network, to view an event, according to an exemplary embodiment.

FIG. 7 is a flowchart of a process for participating in a virtual community, over a wireless network, to view an event, according to an exemplary embodiment. By way of example, a user can participate in the virtual community by purchasing a ticket for an event. For instance, the user of the mobile device 507a can purchase this ticket from the web ticket office 419. Upon confirmation of the ticket purchase, the ticket office 419 issues certification information (e.g., digital certificates) for the mobile device 507a to receive the multimedia stream and to subsequently join the virtual community. The process resembles that of the process of FIG. 2.

Prior to the event, in step 701, the mobile device 507a initiates the login process through, for example, a Uniform Resource Locator (URL) provided by the ticket office 419.

The web interface (e.g., web site or web server) provides links to multiple proxy servers 501a-501n, as shown in FIG. 6 (step 703).

The mobile user decides which one of the proxy servers 501a-501n to be used, or is to be directed to a proxy server chosen by the web service. Once the mobile device 507a establishes connection to the proxy server 501 (step 705), a secure channel is established using a secure session (e.g., Secure Sockets Layer (SSL)) through which the mobile device 507a can deposit the security credential granted by the ticket office 419 on to the proxy server 501, per step 707.

In step 709, the mobile device 507a downloads a client-side applet using the existing secure connection (e.g. SSL).

Thereafter, the proxy server 501 and the mobile device 507a exchange their own security information to form a security association for the duration of the virtual community (step 711). For example, both the proxy server 501 and the mobile device 507a can publish their own signatures and certificates signed by a well known certificate authority (CA), negotiate a commonly acceptable encryption and hashing mechanisms, exchange session keys and establish key life cycles. From that point on, the proxy server 501 has all the information needed to establish connection to the authentication server, stream server, camera set control, and virtual community hub/servers. It is noted that this process is transparent to servers in the unshared secure network 409; that is, the servers in network 409 do not have any knowledge as whether the proxy server 501 is merely an agent for the wireless users or a direct participant (i.e., "real" end user). Such transparency significantly simplifies the design of overall system architecture and reduce overhead of system management.

As in step 713, the mobile device 507a establishes a single communication session in support of the video transmission of the remote event, as explained previously. By using client side applet and deploying the mobile proxy servers to interface the virtual community system and to the stream servers, requirements on the mobile devices are lowered to that of minimum. Mobile devices with adequate bandwidth and computation power will be able to participate in the remote event through the virtual community.

FIG. 8 is a diagram of an exemplary camera array used in the system of FIG. 1, according to an exemplary embodiment. By way of example, the camera set 105a includes a camera controller 801 to interface with the control module 121 through a network array controller 821, thereby permitting the users to control the camera set 105a. The networked array controller 821 controls the movement of a plurality of camera sets in the camera array. The networked array controller 821 communicates with the control module 121 through a private connection 823 to receive control signals from the users, and passes camera status back to the users. A motorized gear 803 physically steers the camera in response to user control signals. A zoom mechanism 805 allows the camera to cover the entire view of the court, and to close up with reasonable resolution to an object of interest. The camera set 105a can be equipped with a microphone 807 to capture audible sounds accompanying the event. The microphone 807, in an exemplary embodiment, is a telescopic microphone for directing the source of the audio. As mentioned, the user can choose to listen to other publicly shared audio signals, such as a TV broadcast commentator.

The camera set 105a, in an exemplary embodiment, may have additional video and audio signal processing elements (not shown) and the outputs are sent to the stream module 117, while incoming control signals from the user are processed through the control module 121 before transmitted to individual camera sets through networked array controller 821. The users do not have direct access to the camera set 105; this provides an added security measure. This arrangement can provide interoperability of remote control protocols, in addition to simplifying construction of the camera sets 105a-105n. For example, the camera sets 105a-105n can be constructed using off-the-shelf CCTV (closed circuit TV) components, which may use a proprietary control protocol to be converted to the control protocol, through the control module 121, for compatibility with that of the user's control console. The control signals to and from the user can be encoded as encrypted data flow for security and privacy.

In an exemplary embodiment, the camera set 105 can be mounted in a manner that provides reasonable freedom to move the camera lens to a direction without interfering with other neighboring cameras or actual spectators. Also, the space requirement for installation of the camera array can be minimal, as the set 105 need not have to be on the ground. Consequently, more people can effectively "go to a game."

The above described processes relating to viewing of an event as a virtual community may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
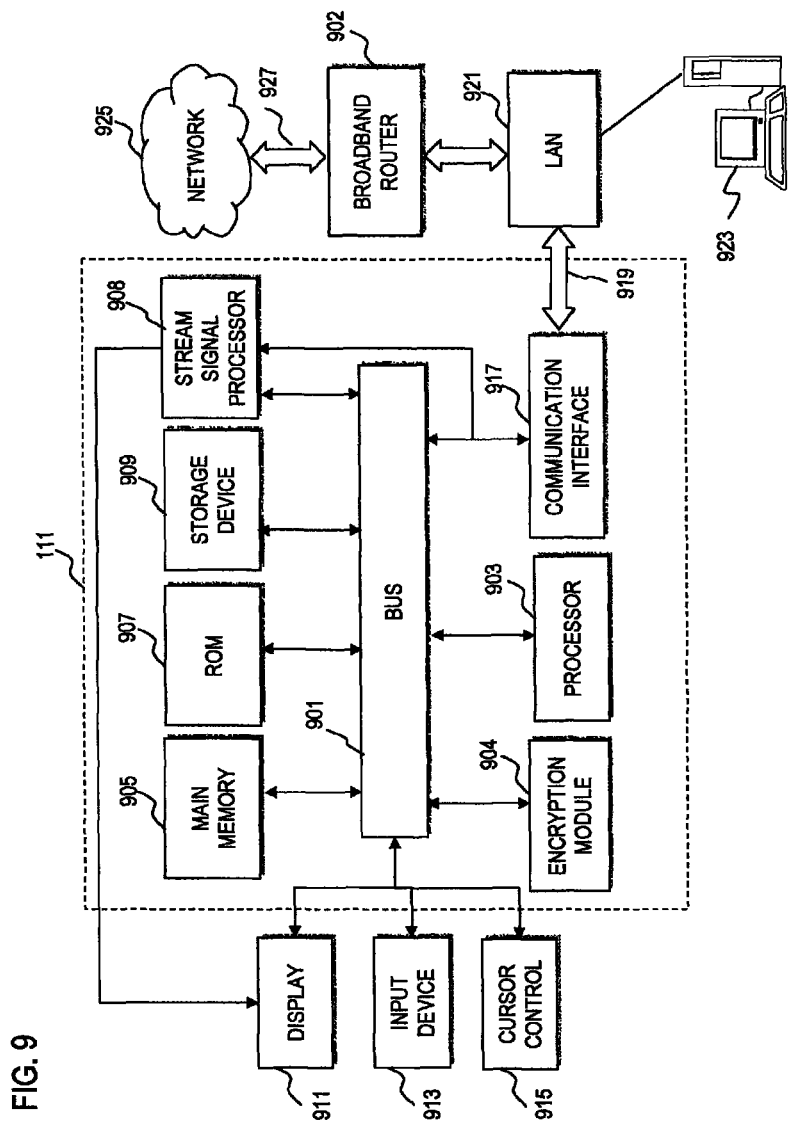
FIG. 9 is a diagram of a computer system that can be used to implement various exemplary embodiments.

FIG. 9 illustrates a computing system deployed as the set-top box 111, according to an exemplary embodiment. The set-top box 111 includes a bus 901 or other communication mechanism for communicating information and a processor 903 coupled to the bus 901 for processing information. The set-top box 111 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The set-top box 111 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The set-top box 111 may be coupled via the bus 901 to a display 911, such as a cathode ray tube (CRT), liquid crystal display, active matrix display, plasma display or a High Definition Television (HDTV), for displaying information to a user. An input device 913, such as a keyboard including alphanumeric and other keys, or a touch screen, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment of the invention, the processes described herein are performed by the set-top box 111, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. Encrypted data can be processed by an encryption module 904, which can be implemented with an ASIC or an FPGA. In this multi-processing arrangement, both processor 903 and encryption module 904 are employed to execute the instructions contained in main memory 905. In alternative embodiments, other hard-wired circuitry may be used in place of or in combination with software instructions to implement the exemplary embodiment. Thus, exemplary embodiments are not limited to any specific combination of hardware circuitry and software.

The set-top box 111 also includes a communication interface 917 coupled to bus 901. The communication interface 917 provides a two-way data communication coupling to a network link 919 connected to a local network 921. For example, the communication interface 917 may be an Ethernet™ card to provide a data communication connection to the local network (LAN) 921. Wireless links such as, for example, IEEE (Institute of Electrical and Electronics Engineers) 802.11G with 54 Mbps (Megabit per second) peak data rate can also be deployed as the local network interface. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through LAN 921 to a host computer 923, which is used by the user as the control console. The LAN has connectivity to a network 925 (e.g. a wide area network (WAN) or the global packet data communication network now commonly referred to as the "Internet") or to data equipment operated by a service provider, through a high speed link 927 terminated at the broadband router 102. The high speed interface on the broadband router 102 may be a high speed digital subscriber line (DSL) card, a cable modem, an optical fiber modem, or any other high speed communication interface to provide a data communication connection to a corresponding type of communication line. The local network 921, broadband router 102 and the network 925 all use electrical, electromagnetic, or optical signals to convey information and instructions. The signals through the various networks and the signals on the network link 919 and through the communication interface 917 are exemplary forms of carrier waves bearing the information and instructions. In this particular example, stream data flow is directly sent from the communication interface 917 to a stream processor 908. The stream processor 908 performs various signal transforming and conditioning functions such as de-compression and codec to format the stream signals into the electrical signals for the display 911. The stream processor 908 has a dedicated connection directly to the display 911. Processed signals by stream processor 908 are directly passed on to the display 911 without delays that is inherently unavoidable through a bus system. Connection from the display 911 to the bus 901 in this scenario is primarily used for passing control signals and displaying error messages generated within the set-top box 111.

The set-top box 111 can send and receive data, including program code, through the network(s), the network link 919, and the communication interface 917. In this example, a server (not shown) might transmit requested code belonging to an application program for implementing an exemplary embodiment through the network 925, the broadband router 102, the local network 921 and the communication interface 917. The processor 903 may execute the transmitted code while being received and/or store the code in the storage device 909, or other non-volatile storage for later execution. In this manner, the set-top box 111 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, twisted copper wires and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a hard disk, a CD-ROM, a CDRW, a DVD, a RAM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such as scenario, the remote computer sends the instructions over the network 925 to the broadband router 102 through an optical fiber cable (927). The broadband router 102 receives the data and formats the data into IEEE 802.11G packets, which are then modulated and amplified before being transmitted to an RF antenna (not shown). The wireless signals are carried by the carrier waves across a free space and are received by the wireless LAN switch 921. The LAN switch 921 processes the wireless signals and encapsulates the data into Ethernet™ packets which are then transmitted through the LAN connection 919 to the communication interface 917. The communication interface 917 processes the Ethernet™ packets to retrieve the instructions borne in the Ethernet™ packets and places the data on the bus 901. The bus conveys the data to main memory, from which a processor retrieves and executes the instructions. The instructions received by main memory can optionally be stored on storage device either before or after execution by processor.

Figure 10:
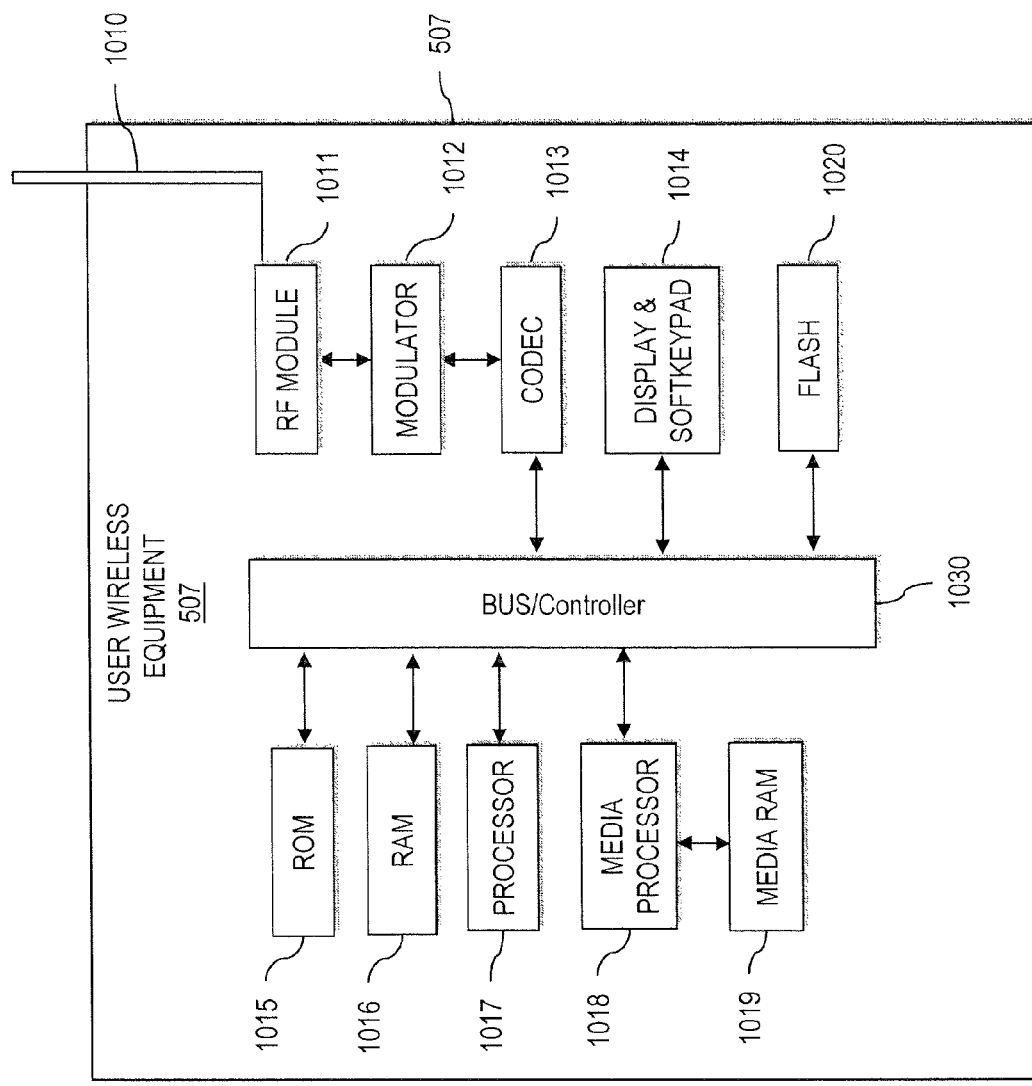
FIG. 10 is a diagram of user wireless equipment (e.g., mobile station), according to an exemplary embodiment.

FIG. 10 is a diagram of user wireless equipment (e.g., mobile station), according to an exemplary embodiment. The radio signals are received or emitted through a multiplexer (not shown) on the antenna 1010. RF module 1011 and modulator 1012 are analog components to power up signal strength, synchronize and stabilize frequency, and convert between radio signals and digital signals. CEDEC 1013 processes data into proper digital format that is to be processed by the media processor 1018 and then displayed on the display 1014. A dedicated media RAM 1019 is directly accessible by the media processor 1018. The system 507 also has a general purposed processor 1017 that runs an operating system (OS) to manage all the resources, including the ROM 1015, RAM 1016 and input/output (IO) component 1014. The device may have a dedicated bus for media signals (not shown) or all signals are transmitted through the system bus/controller 1030, as illustrated in this exemplary architecture. A FLASH memory 1020 is equipped to store application specific programs, which can be installed through an IO interface such as USB (Universal Serial Bus) (not shown) or downloaded from the network. Processor 1017 may also be able to control the analog components, for example to shutdown or reduce the power on the RF module 1011. Battery and power management components can also be used (not shown).

Figure 11:
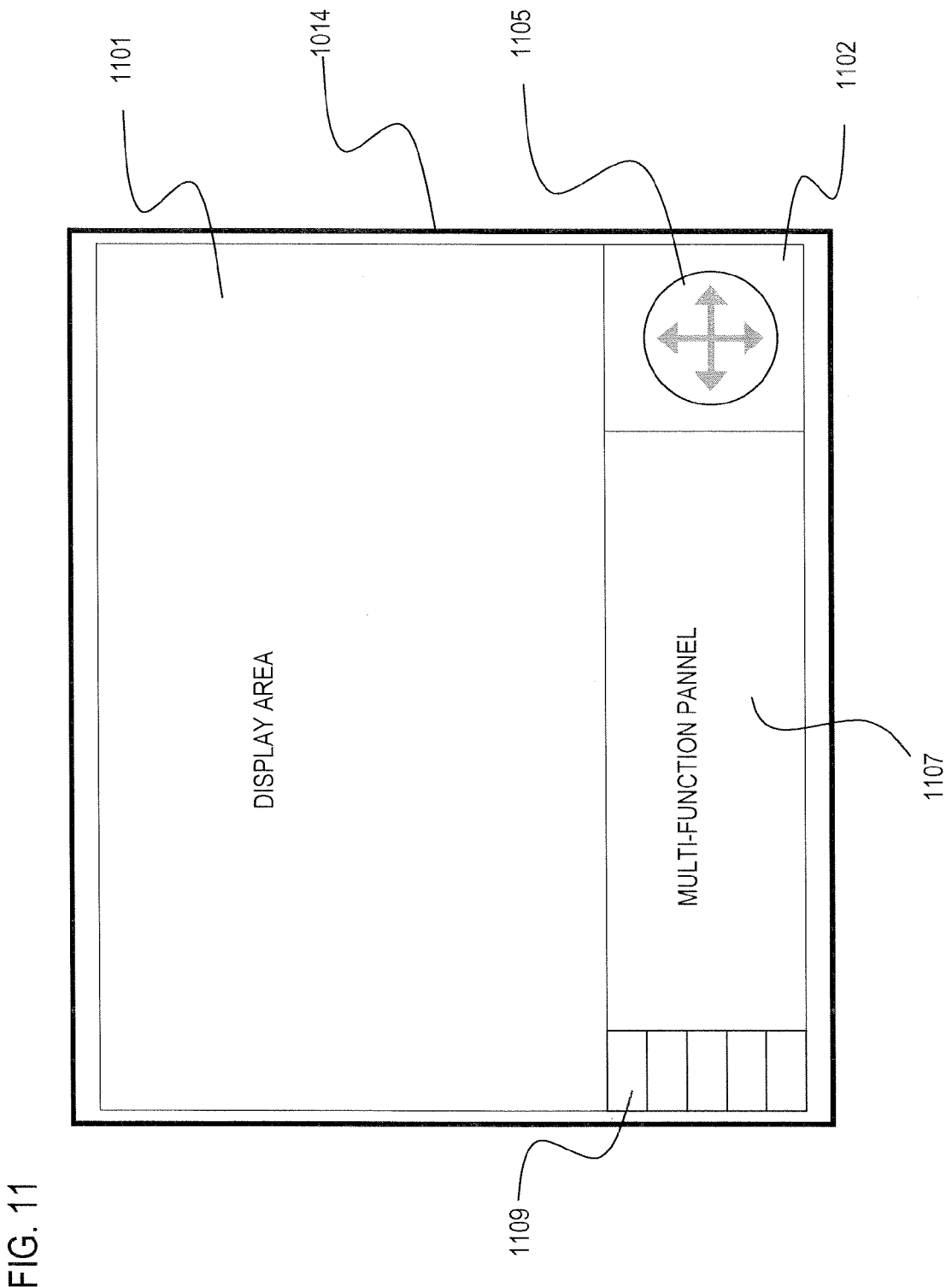
FIG. 11 is a diagram of an exemplary display panel including a soft keypad for use in the wireless equipment of FIG. 10.

FIG. 11 is a diagram of an exemplary display panel including a soft keypad for use in the wireless equipment of FIG. 10. When no input is needed, the entire window is used for display (not shown). When IO is desired or communication from other virtual community participants needs to be displayed, the window is divided by the client side applet into display 1101 and soft keypad 1102. The soft keypad 1102 provides with the user necessary soft keys. In this example, the soft keypad encompasses software implemented mouse 1105, multi-functional panel 1107 that can either display incoming message or provide a software implemented keyboard, and session indicators 1109 that shows which virtual community session is currently active.

In the preceding description, various preferred embodiments have been explained with reference to the accompanying drawings. It will, however, be evident that various modifications and changes may be made thereto, and additional embodiments may be implemented, without departing from the broader scope of the invention as set forth in the claims that follow. The specification and the drawings are accordingly to be regarded in an illustrative rather than restrictive sense.

What is claimed is:

1. A method comprising:
receiving, at a mobile proxy server, certification information corresponding to a ticket purchased for an event, wherein the mobile proxy server interfaces with a virtual community hub and a wireless network, and the ticket permits control, via a mobile device over the wireless network, of a remote camera to view an event from a plurality of viewing perspectives;
using the proxy server to maintain a plurality of communication sessions with the mobile device over the wireless network, wherein the communication sessions correspond to the event and provide participation in a virtual community to experience the event;
receiving, at the mobile proxy server, a video stream of the event, the video stream including video data generated by the remote camera; and
receiving, at the mobile proxy server, control signals from the mobile device to transmit a fragment of the video stream to one or more other mobile devices.

2. A method according to claim 1, further comprising:
transmitting an application to the mobile device for supporting the plurality of communication sessions,
wherein, the mobile proxy server is configured to alter display formats for the mobile device.

3. A method according to claim 2, wherein the application includes an applet that is configured to provide a communication session that simulates multiple simultaneous sessions.

4. A method according to claim 1, further comprising:
establishing a security association with the mobile device via an authentication server for duration of the participation in the virtual community,
wherein the authentication server resides in an unshared secured network.

5. A method according to claim 1, further comprising:
storing display parameters associated with the mobile device in a profile of the mobile device; and
converting, at the mobile proxy server, the video stream to output a formatted stream according to the profile of the mobile device, the formatted stream being transmitted over one of the communication sessions, another one of the communication sessions includes an instant messaging session or an electronic mail message,
wherein the profile specifies display size and display resolution.

6. A method according to claim 1, further comprising:
converting, at the mobile proxy server, the fragment of the video stream to output a formatted stream according to one or more profiles of the one or more other mobile devices,
wherein the wireless network is a cellular network.

7. A method according to claim 1,
wherein the mobile proxy server includes a media format converter and device profile database, the device profile database is configured to store device profiles for the mobile device and the one or more other mobile devices, and
wherein the mobile proxy server resides in a shared customer network.

8. A method according to claim 1, wherein the remote camera is among a plurality of cameras installed within an arena hosting the event, and the remote camera is controlled indirectly.

9. A non-transitory computer-readable storage medium configured to store instructions to execute the method of claim 1.

10. An apparatus comprising:
a communication interface configured to receive certification information corresponding to a ticket purchased for an event, a video stream corresponding to the event, and control signals from a mobile device to transmit a fragment of the video stream to one or more other mobile devices, the communication interface further configured to interface with a virtual community hub and a wireless network, wherein the ticket permits control, via the mobile device over the wireless network, of a remote camera to view an event from a plurality of viewing perspectives, and wherein the video stream includes video data generated by the remote camera; and
a session controller coupled to the communication interface and configured to maintain a plurality of communication sessions with the mobile device over the wireless network, wherein the communication sessions correspond to the event and provide participation in a virtual community to experience the event.

11. An apparatus according to claim 10, wherein an application is transmitted to the mobile device for supporting the plurality of communication sessions.

12. An apparatus according to claim 11, wherein the application includes an applet that is configured to provide a communication session that simulates multiple simultaneous sessions.

13. An apparatus according to claim 10, wherein a security association is established with the mobile device via an authentication server for duration of the participation in the virtual community, and wherein the authentication server resides in an unshared secured network.

14. An apparatus according to claim 10, further comprising:
a profile database configured to store a profile of the mobile device, wherein the profile specifies display size and display resolution; and
a media format converter configured to receive a video stream corresponding to the event and to convert the video stream to output a formatted stream according to the profile,
wherein the formatted stream is transmitted over one of the communication sessions, and another one of the communication sessions includes an instant messaging session or an electronic mail message.

15. An apparatus according to claim 10, wherein the wireless network is a cellular network.

16. An apparatus according to claim 10, wherein the remote camera is among a plurality of cameras installed within an arena hosting the event.

17. An apparatus according to claim 16, wherein the remote camera is controlled indirectly.

18. A method comprising:
communicating with a proxy server, over a wireless network, to participate in a virtual community for experiencing an event;
downloading, from the proxy server, an application for establishing a plurality of communication sessions with the proxy server, the plurality of communication sessions corresponding to the event, and wherein the proxy server is configured to receive a video stream corresponding to the event and to convert the video stream to output a formatted stream according to a profile of a mobile device, and the video stream includes video data generated by the remote camera;
executing the application for controlling via the proxy server a remote camera to view the event from a plurality of viewing perspectives,
receiving, at a mobile device, the formatted stream; and
transmitting, to the proxy server, control signals to transmit a fragment of the video stream to one or more other devices.

19. A method according to claim 18, further comprising:
transmitting, to the proxy server, certification information corresponding to a ticket purchased for the event, wherein the certification information includes a digital certificate.

20. A method according to claim 18, wherein the formatted stream is transmitted over one of the communication sessions, another one of the communication sessions includes an instant messaging session or an electronic mail message, and the profile specifies display size and display resolution.

* * * * *